United States Patent
Domingues Duarte et al.

(10) Patent No.: US 6,938,645 B2
(45) Date of Patent: Sep. 6, 2005

(54) PROTECTIVE SHEATH HAVING A LONGITUDINAL STRIP MADE OF FLEXIBLE MATERIAL, AND METHOD OF MANUFACTURING SUCH A SHEATH

(75) Inventors: Domingos Domingues Duarte, Ortigosa (FR); Emmanuel Klinklin, Turckheim (FR); Pascal Commeaux, Baume les Dames (PT)

(73) Assignee: Sofanou S.A., Anteuil (FR)

( * ) Notice: Subject to any disclaimer, the term of this patent is extended or adjusted under 35 U.S.C. 154(b) by 91 days.

(21) Appl. No.: 10/679,666

(22) Filed: Oct. 6, 2003

(65) Prior Publication Data

US 2004/0129331 A1 Jul. 8, 2004

Related U.S. Application Data

(63) Continuation of application No. PCT/IB02/01365, filed on Apr. 24, 2002.

(30) Foreign Application Priority Data

Apr. 25, 2001 (FR) .......................................... 01 05544
Jun. 5, 2001 (FR) .......................................... 01 07291

(51) Int. Cl.$^7$ ................................................. F16L 9/00
(52) U.S. Cl. ..................... 138/156; 138/110; 138/121; 138/122; 138/128; 138/156
(58) Field of Search ................................. 138/121, 122, 138/128, 151, 156, DIG. 8

(56) References Cited

U.S. PATENT DOCUMENTS

| 2,826,523 | A | * | 3/1958 | Blaszkowski et al. | ......... 428/12 |
| 4,296,157 | A | * | 10/1981 | Conti | ......... 138/121 |
| 6,096,975 | A | | 8/2000 | Streit | ......... 174/68.3 |
| 6,315,001 | B1 | * | 11/2001 | Anderson | ......... 138/106 |
| 6,488,053 | B1 | * | 12/2002 | Tadokoro | ......... 138/156 |
| 6,843,276 | B2 | * | 1/2005 | Tadokoro | ......... 138/121 |

FOREIGN PATENT DOCUMENTS

| FR | 2745429 A1 * | 8/1997 | ........... F16L/21/00 |
| JP | 2000 115945 | 4/2000 | |

* cited by examiner

*Primary Examiner*—Patrick Brinson
(74) *Attorney, Agent, or Firm*—Sturm & Fix LLP

(57) ABSTRACT

An annulated tubular sheath which is split down a longitudinal section thereof. According to the invention, a longitudinal strip of the sleeve is made of a flexible material and is disposed in an angular position of 5–180 degrees in relation to the longitudinal section or is disposed in the region of the sheath in which the longitudinal section is made. Preferably, the flexible material is a thermoplastic elastomer. The invention also relates to a method for producing a sleeve by extruding a plastic material, a longitudinal strip made of a flexible material obtained by co-extruding an elastomer material. A device for carrying out said method comprises an extrusion head provided with an insert for placing the co-extrusion in a stop position on a die in order to block the flow of the extruded plastic material and to enable the flow of elastomer material.

3 Claims, 3 Drawing Sheets

PROTECTIVE SHEATH HAVING A LONGITUDINAL STRIP MADE OF FLEXIBLE MATERIAL, AND METHOD OF MANUFACTURING SUCH A SHEATH

CROSS REFERENCE TO RELATED APPLICATIONS

This application is a Continuation application of PCT/IB02/01365 filed Apr. 24, 2002, which claimed priority of French Application No. 0105544 filed Apr. 25, 2001 and French Application No. 01/07291 filed Jun. 5, 2001, both entitled "Protective Sheath Comprising a Longitudinal Flexible Material, Strip and Method for Producing said Sheath" all of which are included in their entirety by reference made hereto.

BACKGROUND OF THE INVENTION

1. Field of the Invention

The present invention relates to a ringed tubular sheath which is slit along a longitudinal cut in the sheath.

2. Description of the Related Art

Ringed tubular sheaths, that is to say ones whose shape resembles a succession of rings connected to one another, are usually made of extruded plastic materials such as polypropylene, polyamide or polyesters. These sheaths make it possible to produce complex protective networks for bundles of electrical wires or cables within ships, aircraft or automobile vehicles and, particularly in this latter case, in the engine compartment. This type of process is described in greater detail, for example, in documents FR 2 171 844, GB 1 250 639 and GB 1 311 205.

In order to permit the installation of the wires or cables inside these sheaths, the latter are slit. That is to say, they have been cut along a longitudinal straight line at the end of the manufacturing process. It is then possible to introduce electrical wires and cables later, in any zone of the sheath, directly through the slit. One of the main characteristics of a slit ringed tube is its capacity for closing up again after being opened, this characteristic being provided by the resilience of the vertical walls of the ringed portions.

These protective sheaths may have more or less elaborate systems of closures in order to prevent the tube from allowing the wires to escape in zones having low radii of curvature, where the slit tends to open up again. A number of known documents describe these types of sheath, in particular DE-U-89 030 70, EP 0 114 213, DE 34 05552 and WO 97 323 79.

Although they are satisfactory in the majority of cases, a number of drawbacks are nevertheless found to remain. On the one hand, the force required to open the sheath, with or without a closing system, is too great. The sheaths may thus be strongly resistant at the time of introduction of the cables and often, when the latter are being installed, the operator is obliged to use a tool in order to enable him to introduce the cables and wires without injuring himself.

On the other hand, the installation of the components produces an irreversible deformation of the ringed portions, so the return to the initial position is more awkward. Under these circumstances, the tube may have a slit of several tenths of a millimetre (or even several millimetres), and this constitutes a drawback as regards the protection of the wires or cables that are present inside. The permanent deformation of the tube in the course of opening is linked to the fact that the plastic material has passed beyond its zone of elastic deformation.

Finally, in the case of sheaths with a closing system, the latter gives rise, because of its non-ringed shape, to a rigidity which is ill-suited to the routing of the cables.

Japanese Patent Application JP 2000 115945 discloses a ringed and slit tubular sheath comprising one or more longitudinal grooves disposed at 45° on either side of the longitudinal cut. The grooves extend from the peak to the trough of the corrugations, but without passing through the wall forming the common base of the trough of the corrugations, so as to function as hinges that facilitate the introduction of the cables into the interior of the slit sheath.

European Patent Application EP 859 440 discloses a ringed and slit tubular sheath comprising corrugations of reduced height in the region in which the longitudinal cut is made, so as to create a hinge effect between each edge of the slit and the rest of the periphery of the sheath. This results in greater ease of introduction of the cables into the interior of the slit sheath.

In these two known examples, the hinge effect is the result of a reduction in the thickness of the sheath. This reduction in thickness can lead to wearing and tearing of the sheath in the region of the hinge.

The object of the invention is to overcome the drawbacks indicated above.

BRIEF SUMMARY OF THE INVENTION

To that effect, the subject of the invention is a ringed tubular sheath which is slit along a longitudinal cut in the sheath, characterised in that a longitudinal strip of the sheath is made of flexible material and occupies an angular position of between 5 and 180 degrees in relation to the longitudinal cut, or occupies that region of the sheath in which said longitudinal cut is made.

When the angular position of the strip made of flexible material is between 5 and 180 degrees, it provides a hinge effect that facilitates the introduction of the cables into the interior of the slit sheath. When the longitudinal cut in the sheath is made in the strip made of flexible material, the two edges of the slit deform easily and are rendered much less strongly resistant to an operator or to the cables themselves when they are being introduced into the sheath.

Other advantages of the invention will become apparent on reading the description of two modes of embodiment illustrated by the drawings. FIGS. 1 to 3 relate to a first mode of embodiment of the invention. FIGS. 4 and 5 relate to a second mode of embodiment. FIGS. 6 and 7 relate to a device for implementing a method of manufacturing a sheath according to the first or second mode of embodiment of the invention.

BRIEF DESCRIPTION OF THE SEVERAL VIEWS OF THE DRAWINGS

More precisely.

BRIEF DESCRIPTION OF THE PREFERRED EMBODIMENT

A ringed tubular sheath which is slit along a longitudinal cut 1 in said sheath is represented in FIGS. 1 to 3 and FIGS. 4 and 5.

Figure 1:
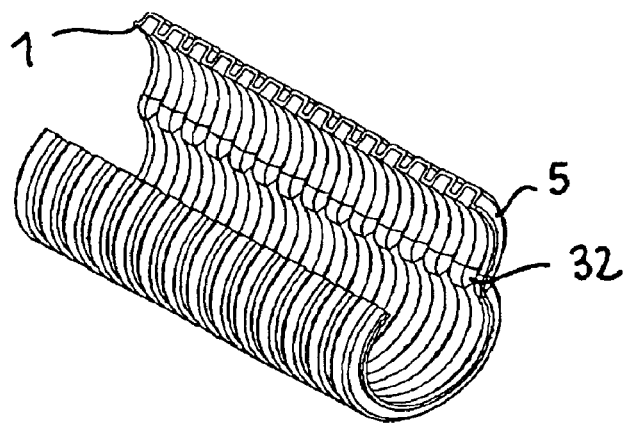
FIG. 1 is a view in perspective of a sheath with a single flexible longitudinal strip.
Figure 2:
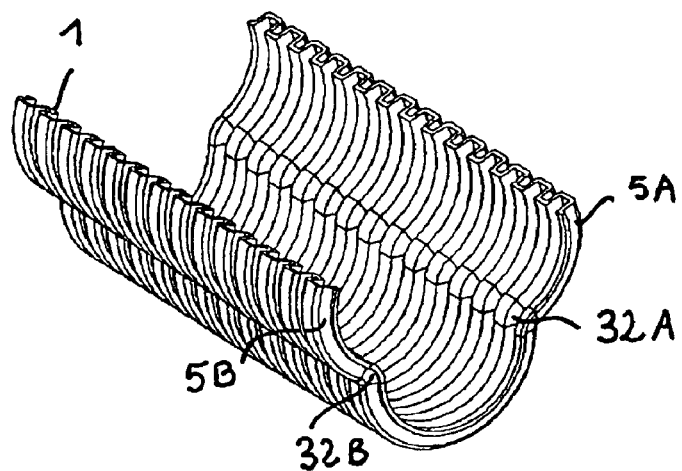
FIG. 2 is a view in perspective of a sheath with two flexible longitudinal strips which are symmetrical in relation to the slit in the sheath.
Figure 3:
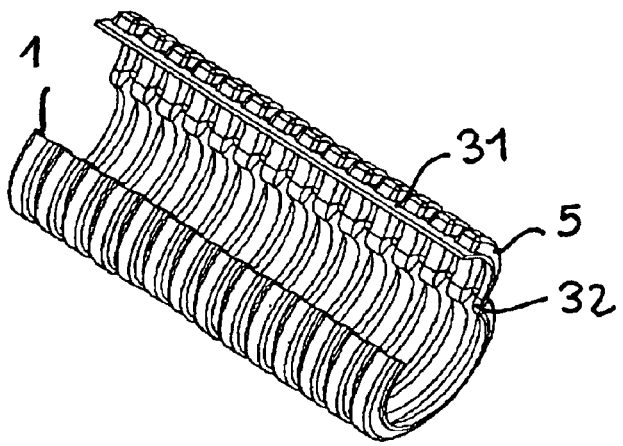
FIG. 3 is a view in perspective of a sheath having a narrow closing tongue made of flexible material which makes it possible to open the sheath.

According to a first mode of embodiment of the invention—FIGS. 1 to 3—a part of the sheath which takes the form of a longitudinal strip 32 is made of flexible material, for example thermoplastic elastomer. The flexible part is situated at about 50 degrees from the slit in the sheath. Since this flexible part is limited to a restricted zone of the perimeter, it does not modify the characteristics of the original product. On the other hand, it provides the sheath with a hinge effect, which makes it possible to open said sheath with much less effort, and thus avoids the use of a tool. In FIGS. 1 to 3, the sheath is represented in the open position. In FIGS. 1 to 3, one edge 5 of the slit is raised towards the outside by pivoting about the longitudinal strip 32 made of flexible material, which acts after the fashion of a hinge. In FIG. 2, the two edges 5A and 5B of the slit are raised towards the outside by pivoting about longitudinal strips 32A and 32B.

The elasticity of the flexible material used permits very satisfactory closure of the sheath and an automatic return to the closed position. The elastic deformations that are permissible on the co-extruded material are, in actual fact, much greater than on the main material of the sheath.

It should be noted that the longitudinal strip made of flexible material can also be lowered towards the interior of the sheath, and thus function after the fashion of a flap-valve when the components are being introduced.

In order to make it possible to install components with diameters equivalent to the internal diameter of the sheath without deforming the latter, two co-extrusions of flexible material are preferably carried out on the same sheath, as explained previously. These two strips of flexible material 32A and 32B are symmetrical in relation to the longitudinal slit. Through this double hinge effect, the opening of the sheath is multiplied by two without any irreversible deformation.

Figure 4:
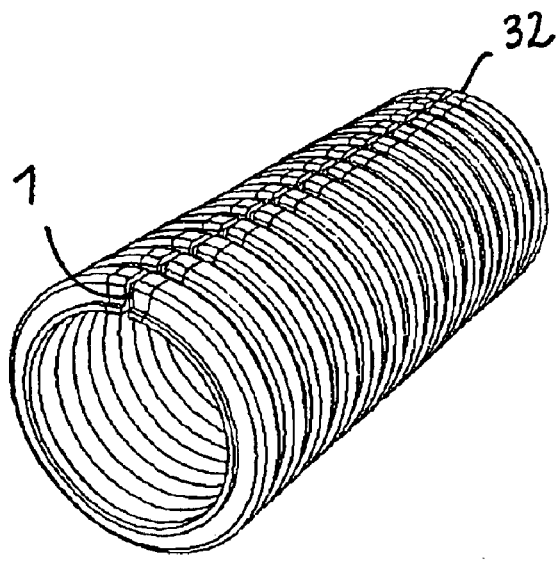
FIG. 4 is a view in perspective of a sheath having a longitudinal cut which is made in a region made of flexible material.
Figure 5:
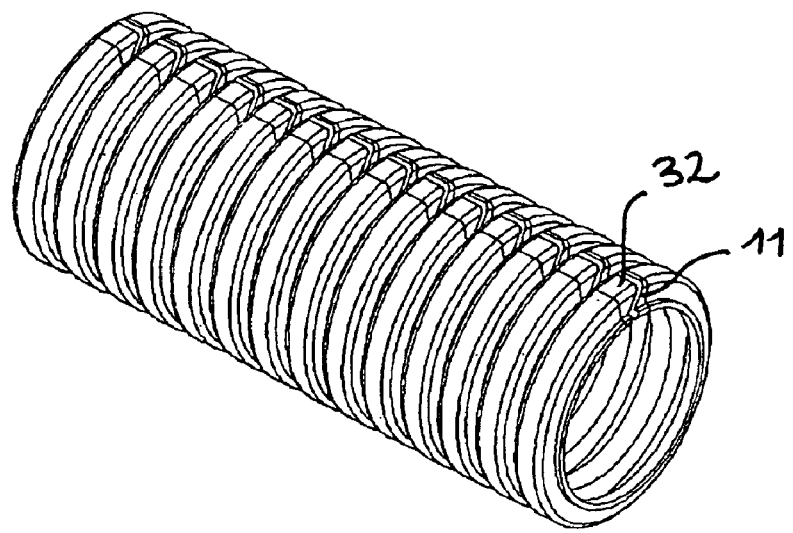
FIG. 5 is a view in perspective of a sheath having a longitudinal cut made in a region made of flexible material, the slit being on the slant.

According to a second mode of embodiment of the invention—FIGS. 4 and 5—a part 32 of the tube in which the longitudinal cut 1 is situated is made of flexible material, for example thermoplastic elastomer. This zone made of flexible material prevents the strong resistance that may be brought about by the slit, combined with the presence of the corrugations of the sheath. Moreover, since this flexible part is limited to a restricted zone of the perimeter, it does not modify the characteristics of the original product, in particular the transverse rigidity. The longitudinal cut made in the strip made of flexible material makes it possible, advantageously, to totally eliminate the noise of rubbing of the two edges of the slit, which noise is usually observed in the known sheaths belonging to the prior art.

According to one variant of embodiment, that region of the sheath made of flexible material in which the longitudinal cut is made comprises a longitudinal, continuous, non-ringed narrow tongue which is arranged on one of the edges of the slit and accommodated at the level of the trough of the corrugations of the sheath. This narrow tongue made of flexible material possesses a low width, for example a few millimetres, and eliminates the rigid zone that exists when said narrow tongue is manufactured from the same material as the sheath, thus giving rise to major rigidity of the sheath and producing "pleats" when the latter is curved.

That longitudinal cut in the sheath which is made in the strip of flexible material 32 is preferably orientated on the slant. A slanting slit 11 of this kind offers the advantage of improved behaviour in respect of curving, compared to a known sheath belonging to the prior art, in so far as the sheath remains closed in the case of larger curves. The fact that this slit profile is made in the strip of flexible material renders the edges of the slit devoid of any strongly resistant character.

A sheath according to the first or second mode of embodiment of the invention is manufactured by a method of manufacturing by the extrusion of plastic material, the longitudinal strip made of flexible material being obtained by co-extrusion of an elastomer material.

In the case of a sheath according to the first mode of embodiment, the co-extrusion is positioned on a generatrix located at an angle which may vary between 5 and 180 degrees from the point at which the longitudinal cut in the sheath is made. According to a preferred mode of embodiment, the co-extrusion is positioned at approximately 50 degrees from the slit and the width of the co-extrusion represents between 0.5 and 10 mm, and preferably between 2 and 5 mm. This mode of embodiment is adapted to a standard sheath or to a sheath possessing a narrow closing tongue 31 which can be seen in FIG. 3.

In the case of a sheath according to the second mode of embodiment, the sheath is manufactured by a co-extrusion that takes place strictly at the point at which the longitudinal cut in the tube is made in the case of a protective sheath without a closing system, or by a co-extrusion in flexible material of the zone in which the narrow closing tongue is situated in the case of a sheath possessing a narrow tongue of this kind. The slit will then be made at the point at which the flexible material is located.

In the case of sheaths without a closing system, the width of the co-extrusion preferably represents between $\frac{1}{12}$ and $\frac{1}{3}$ of the internal diameter of the sheath, and preferably between $\frac{1}{10}$ and $\frac{1}{6}$ of said internal diameter. By way of an example, the width of co-extrusion varies between 0.5 mm and 10 mm, and preferably between 2 mm and 5 mm. In the case of sheaths with a closing system, the width of the co-extrusion represents between $\frac{1}{10}$ and $\frac{1}{2}$ of the internal diameter of the sheath, and preferably between $\frac{1}{6}$ and $\frac{1}{3}$ of said internal diameter.

Compared to a method of manufacturing a standard slit, ringed sheath, the method by co-extrusion merely requires modification of the extrusion head in order to permit the arrival of the second thermoplastic elastomer material on the initial profile upstream of a moulding machine. In the context of a manufacturing operation having two strips of flexible material, the co-extruding device on the extrusion head must be doubled.

Figure 6:
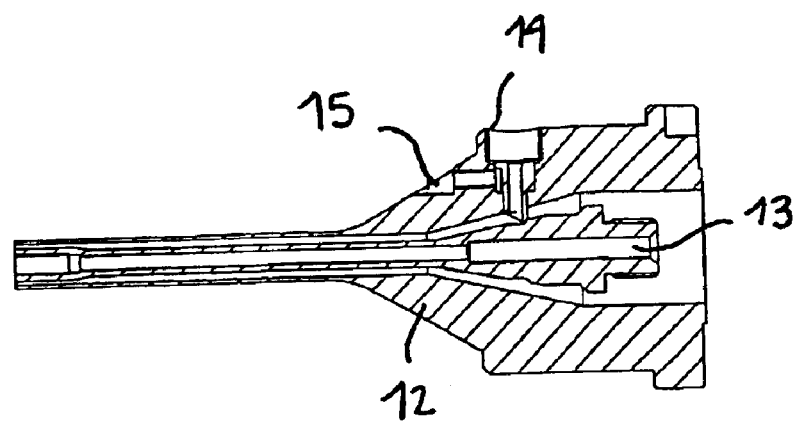
FIG. 6 is a diagrammatic view of a draw-plate die of an extrusion head.

FIG. 6 illustrates a draw-plate die of an extrusion head. Reference 14 designates the insert at which the co-extrusion is positioned within the draw-plate 12. Reference 13 designates the die. In order to permit a co-extrusion over the whole of the wall-thickness of the ringed sheath, the insert 14 permitting the positioning of the co-extrusion comes into abutment against the die 13, thus blocking the flow of the main material. The oblique end of reference 14 favours the orientation of the flexible material. Reference 15 designates the positioning of a mechanical block permitting the orientation of the co-extrusion insert 14.

Figure 7:
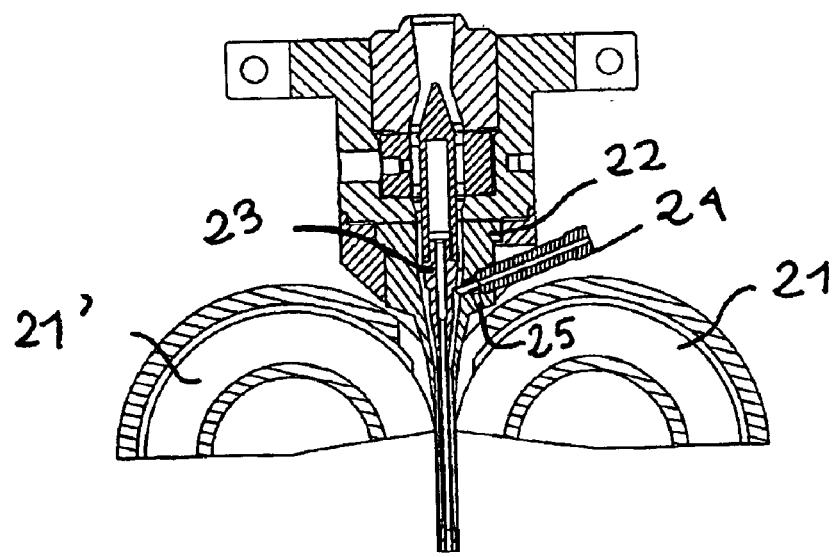
FIG. 7 is a diagrammatic view of an extrusion head as well as part of a moulding machine.

FIG. 7 illustrates an extrusion head with a part of a moulding machine comprising two series of parallel and symmetrical shells 21 and 21'. Reference 24 shows the co-extrusion positioned within the draw-plate 22 in abutment against the die 23 and orientated by the mechanical insert 25. In the case of a sheath according to the second mode of embodiment of the invention, the co-extrusion is positioned in the same horizontal plane of circulation as the half-shells.

A sheath according to the invention remains inexpensive to manufacture by the co-extrusion method.

What is claimed is:

1. Apparatus comprising: a corrugated tubular sheath which is slit along a longitudinal cut in the sheath, the sheath having a longitudinal strip of the sheath constructed of a thermoplastic elastomer and occupying an angular position of between 5 and 180 degrees in relation to the longitudinal cut or occupying that region of the sheath in which said longitudinal cut is made.

2. The sheath according to claim 1, the sheath comprises at least a portion which is the thermoplastic elastomer and wherein the longitudinal cut in the sheath is in the thermoplastic elastomer and the cut is orientated on a slant.

3. The slit tubular sheath according to claim 1, wherein the region of the sheath made of the thermoplastic elastomer in which the longitudinal cut is located comprises a longitudinal, continuous, non-ringed narrow tongue which is arranged on one of the edges of the slit and accommodated at the level of the trough of the corrugations of the sheath.

* * * * *